United States Patent [19]
Bolin

[11] Patent Number: 5,472,077
[45] Date of Patent: Dec. 5, 1995

[54] ARTICLE TRANSFER APPARATUS

[75] Inventor: James A. Bolin, Tulsa, Okla.

[73] Assignee: I.M.T.E.C. Enterprises, Inc., Tulsa, Okla.

[21] Appl. No.: 370,518

[22] Filed: Jan. 9, 1995

[51] Int. Cl.$^6$ ................................................ B65G 25/00
[52] U.S. Cl. ........................ 198/430; 198/740; 65/260
[58] Field of Search .................................. 198/429, 430, 198/468.01, 740; 65/118, 260; 364/478

[56] References Cited

U.S. PATENT DOCUMENTS

| | | | |
|---|---|---|---|
| 3,724,639 | 4/1973 | Hara | 198/430 |
| 3,776,342 | 12/1973 | Kulig et al. | 198/430 |
| 3,960,266 | 6/1976 | Becker | 198/235 |
| 4,067,434 | 1/1978 | Mumford | 198/430 X |
| 4,081,073 | 3/1978 | Zappia | 198/430 |
| 4,171,043 | 10/1979 | Doyle | 198/430 |
| 4,290,517 | 9/1981 | Hafferkamp | 198/430 X |
| 4,339,028 | 7/1982 | Meacle | 198/427 |
| 4,528,018 | 7/1985 | Schneider et al. | 65/260 |
| 5,044,488 | 9/1991 | Bolin | 198/430 |
| 5,092,449 | 3/1992 | Bolin et al. | 198/430 |

Primary Examiner—James R. Bidwell
Attorney, Agent, or Firm—Senniger, Powers, Leavitt & Roedel

[57] ABSTRACT

Apparatus for transferring articles such as glass containers from a first conveyor, on which the containers are travelling generally horizontally in line one after another, on to a second conveyor extending generally at right angles to the first conveyor from one side of the first conveyor. The apparatus is operable in cycles to transfer on each cycle a group of articles from the first to the second conveyor with the articles in the group extending in a row transversely of the second conveyor. The apparatus includes a support, a first carriage on the support movable generally parallel to the second conveyor, a second carriage on the first carriage movable with respect to the first carriage generally parallel to the first conveyor, and a third carriage on the second carriage movable vertically with respect to the first and second carriages. The third carriage carries a pusher bar. Each carriage is driven via an endless belt driven mechanism by a motor under the control of a programmable controller which operates the motors during each cycle of the machine to drive the carriages to cause the pusher bar to transfer a group of articles from the first conveyor on to the second conveyor.

6 Claims, 12 Drawing Sheets

ARTICLE TRANSFER APPARATUS

BRIEF SUMMARY OF THE INVENTION

This invention involves an improvement upon the apparatus disclosed in my U.S. Pat. No. 5,044,488 issued Sep. 3, 1991 and U.S. Pat. No. 5,092,449 issued Mar. 3, 1992 on which I am a joint inventor, each entitled Article Transfer Apparatus, for transferring articles from one location to another and, more particularly, to apparatus for transferring articles from a first conveyor, on which the articles are travelling generally horizontally in line one after another in a first direction, on to a second conveyor extending generally at right angles to the first conveyor, the apparatus being operable in cycles to transfer on each cycle a group of articles from the first to the second conveyor with the articles in the group extending in a row transversely of the second conveyor.

Reference may also be made to U.S. Pat. Nos. 3,960,266, 4,081,073, 4,339,028, and 4,528,018. U.S. Pat. Nos. 5,044,488 and 5,092,449 are incorporated herein by reference.

As in said prior U.S. Pat. Nos. 5,044,488 and 5,092,449, the invention has particular (albeit not exclusive) application to the glass container industry where apparatus referred to as a "stacker" is used to transfer molded glass containers travelling in line one after another on a first conveyor (sometimes referred to as the "cross-conveyor") on to a second conveyor (sometimes referred to as the "lehr conveyor") for conveyance of the containers to a lehr or oven. This transfer takes place shortly after the molding step and while the glass containers are still very hot.

While the stacker disclosed in the aforesaid U.S. Pat. No. 5,044,488 and 5,042,449 has been generally satisfactory, it has occasionally had maintenance problems, particularly with regard to the ball screw drive mechanisms used for driving the carriages of the apparatus, resulting in stacker down time. This may be due, in part, to the mechanisms being subject to relatively high temperature on account of their proximity to the hot containers and the lehr. Also, problems were encountered with respect to the ability of the ball screw drive mechanisms to reach and maintain high speeds under load.

Accordingly, among the several objects of the invention may be noted the provision of article transfer apparatus (a "stacker") of improved construction reducing the aforesaid maintenance problems (and down time); and the provision of improved drive mechanisms for the carriages of the apparatus adapted better to stand up under heat from the hot bottles and lehr.

In general, apparatus of this invention is operable for transferring articles such as glass containers from a first conveyor, on which the containers are travelling generally horizontally in line one after another in a first direction o a first horizontal axis, on to a second conveyor extending in a second direction on a second horizontal axis generally at right angles to the first axis from one side of the first conveyor, being operable in cycles to transfer on each cycle a group of articles from the first to the second conveyor with the articles in the group extending in a row transversely of the second conveyor. The apparatus comprises a base positionable at the other side of the first conveyor from the second conveyor, a first carriage mounted on the base for linear horizontal movement at right angles to said first axis and parallel to said second axis between a retracted position spaced away from the first conveyor and an advanced position past the first-conveyor, and means for effecting linear horizontal reciprocation of said first carriage back and forth between its retracted and advanced positions comprising a first endless belt mechanism mounted on the base comprising first and second pulleys mounted on the base for rotation on horizontal axes spaced with respect to the direction of movement of the first carriage, a first endless belt trained around said first and second pulleys having a reach extending parallel to said second axis, an interconnection for said reach of said first endless belt and said first carriage for moving the first carriage parallel to said second axis from its retracted position to its advanced position upon movement of said first belt in one direction and for moving the first carriage back to its retracted position upon movement of said first belt in the opposite direction, and means for driving said first endless belt in opposite direction comprising a reversible electric motor mounted on the base and a first drive from said first motor to said first pulley. The apparatus further comprises a second carriage mounted on the first carriage for reciprocation with the first carriage and for linear horizontal movement on the first carriage parallel to said first axis between a rearward retracted position and a forward advanced position relative to said first conveyor and said first carriage, means for effecting linear horizontal reciprocation of said second carriage back and forth between its retracted and advanced positions comprising a second endless belt mechanism mounted on the first carriage comprising third and fourth pulleys mounted on the first carriage for rotation on horizontal axes spaced with respect to the direction of movement of the second carriage, a second endless belt trained around said third and fourth pulleys having a reach extending parallel to said first axis, an interconnection for said reach of said second endless belt and said second carriage for moving the second carriage relative to the first carriage from the retracted position of the second carriage to its advanced position upon movement of said second belt in one direction and for moving the second carriage back to its retracted position upon movement of said second belt in the opposite direction, and means for driving said second endless belt in opposite directions comprising a reversible electric motor mounted on the first carriage and a second drive from said second motor to said third pulley. The second carriage carries guides extending vertically in a vertical plane parallel to said first axis at one side of the second carriage toward the first conveyor. The apparatus further comprises a third carriage mounted on said guides for movement with the second carriage and for linear vertical movement relative to said second carriage between a lowered position and a raised position relative to the second carriage, means for effecting linear vertical reciprocation of said third carriage up and down between its lowered and its raised positions comprising a third endless belt mechanism mounted on the second carriage comprising fifth and sixth pulleys mounted on the second carriage for rotation on horizontal axes spaced vertically with respect to the direction of movement of the third carriage, a third endless belt trained around said fifth and sixth pulleys having a vertical reach, an interconnection for said vertical reach of said third endless belt and said third carriage for moving the third carriage up from its lowered position to its raised position upon movement of said third belt in one direction and for moving the third carriage back down to its lowered position upon movement of said third belt in the opposite direction, and means for driving said third endless belt in opposite directions comprising a reversible electric motor mounted on the second carriage and a third drive from said third motor to said fifth pulley. The third carriage carries a pusher for pushing a group of articles off the first conveyor on to the second conveyor, said pusher being located at such an elevation relative to the first conveyor when the third carriage is in its said lowered position as to be engageable with said group of articles on the first conveyor on movement of the third carriage with the second and third carriages from the retracted position of the first carriage to its advanced position, and at such an elevation when the third carriage is in its said raised position as to clear the tops of articles on the first conveyor. The apparatus further comprises a programmable controller for controlling said first, second and third electric motors for operation in cycles each starting with the first carriage in its retracted position, the second carriage in its rearward position and the third carriage down in lowered position and comprising operating the first motor in the direction to drive the said reach of the first belt in the direction to move the first carriage inwardly from its retracted to its advanced position, and operating the second motor in the direction to drive the said reach of the second belt to move the second carriage forward to its forward position and moving the pusher forward for pushing a group of articles off the first conveyor and onto the second conveyor, then operating the third motor in the direction to drive the said reach of the third belt to move the third carriage to its raised position for clearing articles advancing on the first conveyor, operating the first motor in the direction to drive the said reach of the first belt in the opposite direction to move the second carriage back to its rearward position, operating the second motor in the direction to drive the said reach of the second belt to move the first carriage back to its retracted position to retract the pusher means, and operating the third motor in the direction to drive the said reach of the third belt in the direction to move the third carriage back down to its lowered position.

Other objects and features will be in part apparent and in part pointed out hereinafter.

BRIEF DESCRIPTION OF THE DRAWINGS

Corresponding numerals indicate corresponding parts throughout the several views of the drawings.

DETAILED DESCRIPTION OF THE PREFERRED EMBODIMENT

Figure 1:
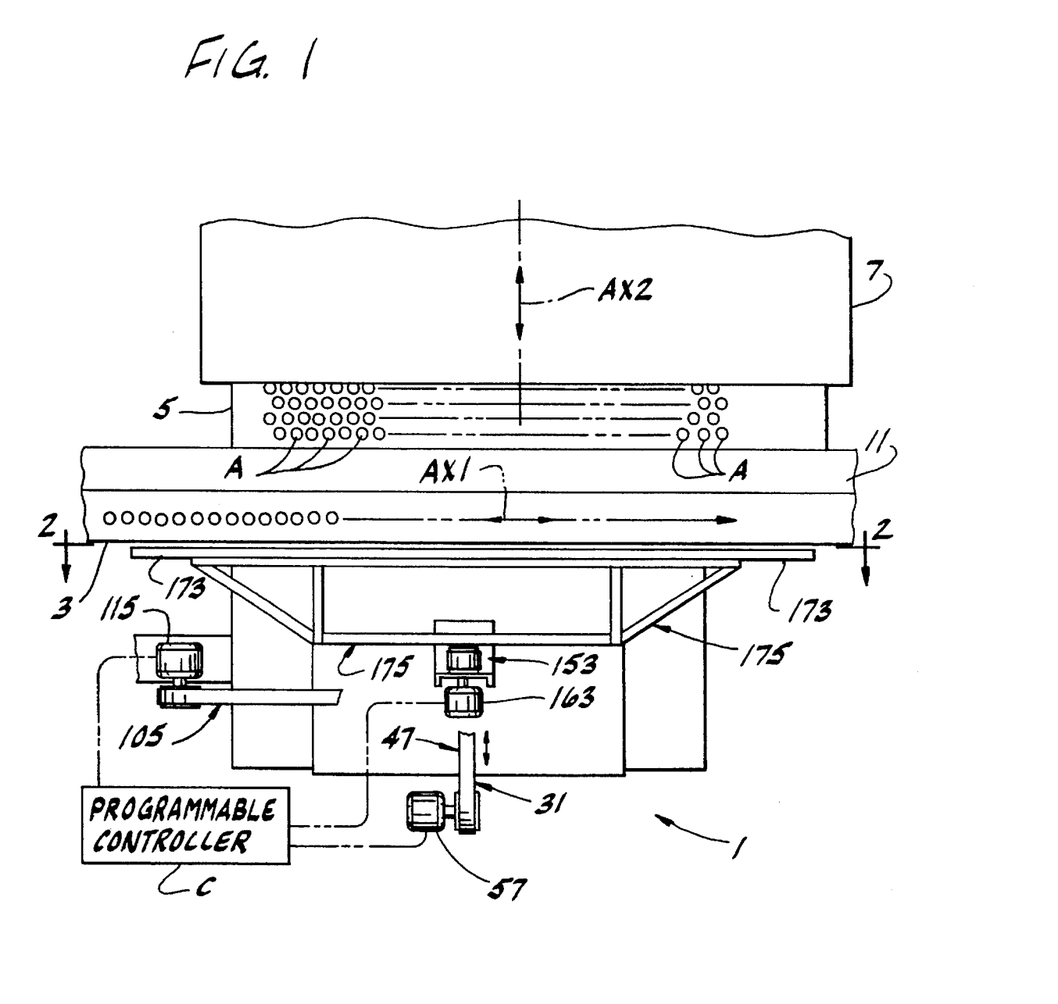
FIG. 1 is a schematic plan view of a stacker of the present invention for transferring containers (e.g., glass bottles) from a cross-conveyor on to a lehr conveyor for conveyance to a lehr.
Figure 2:
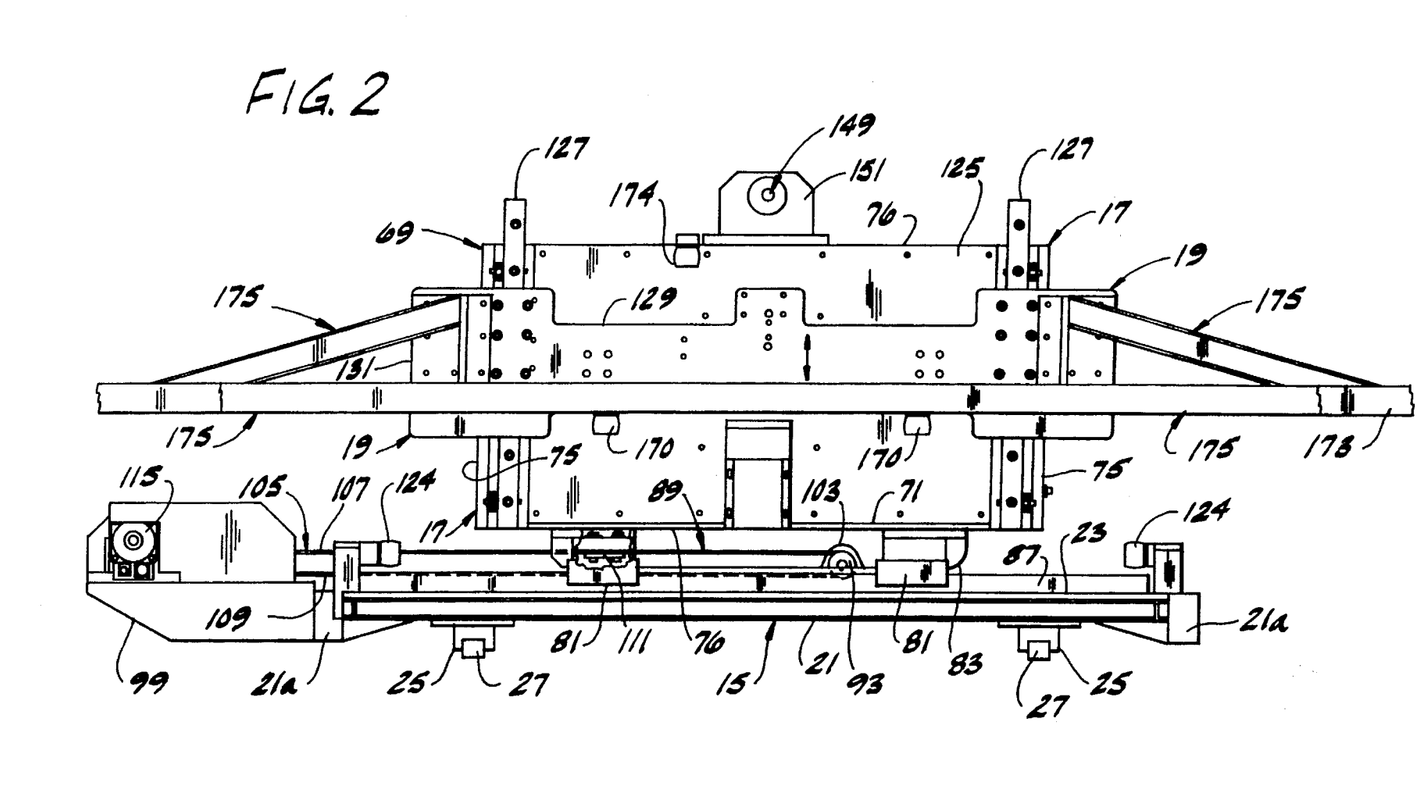
FIG. 2 is a view in front elevation of the stacker as viewed on line 2—2 of FIG. 1 with parts broken away.
Figure 2A:
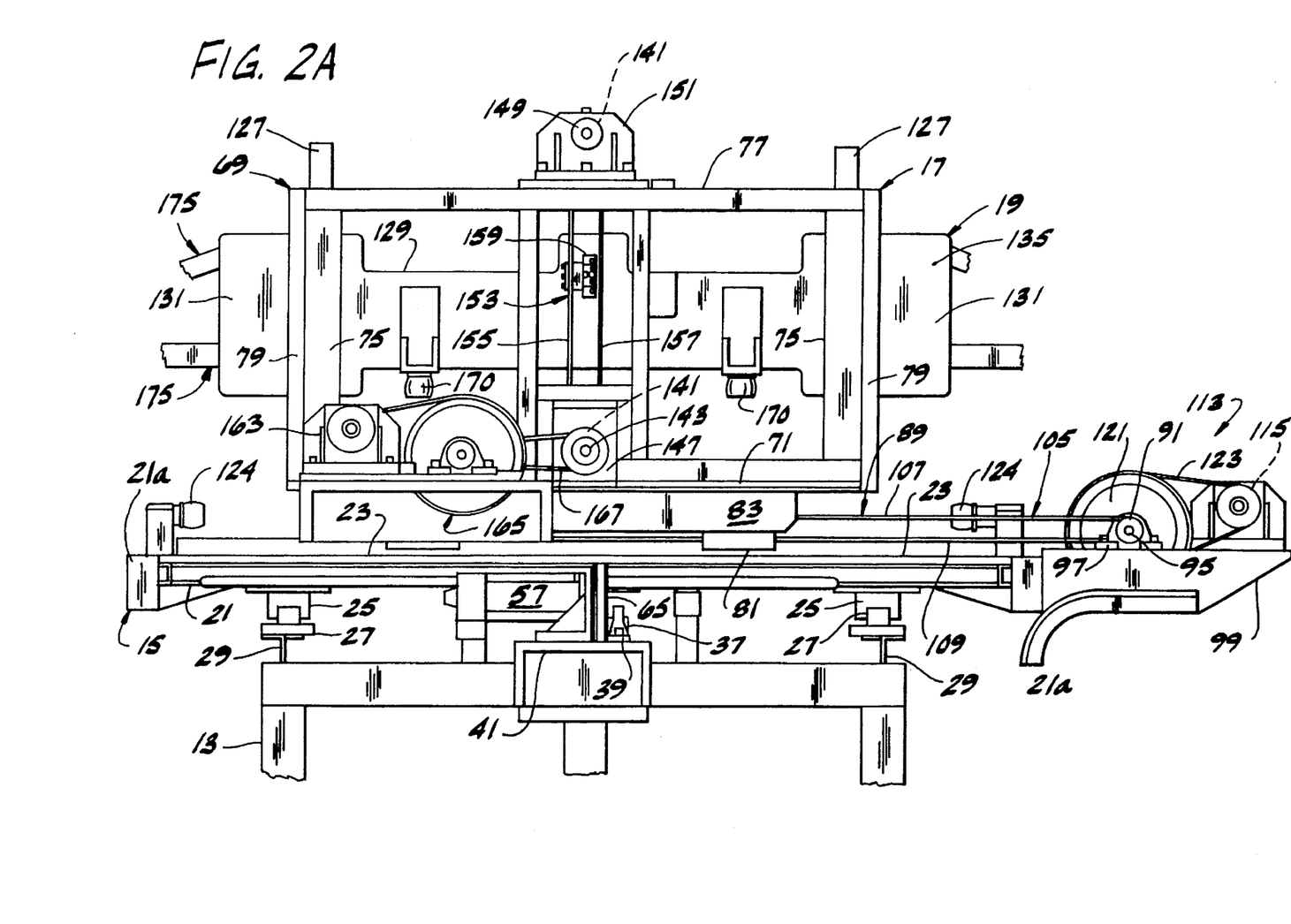
FIG. 2A is a view in rear elevation of the stacker with parts broken away.
Figure 3:
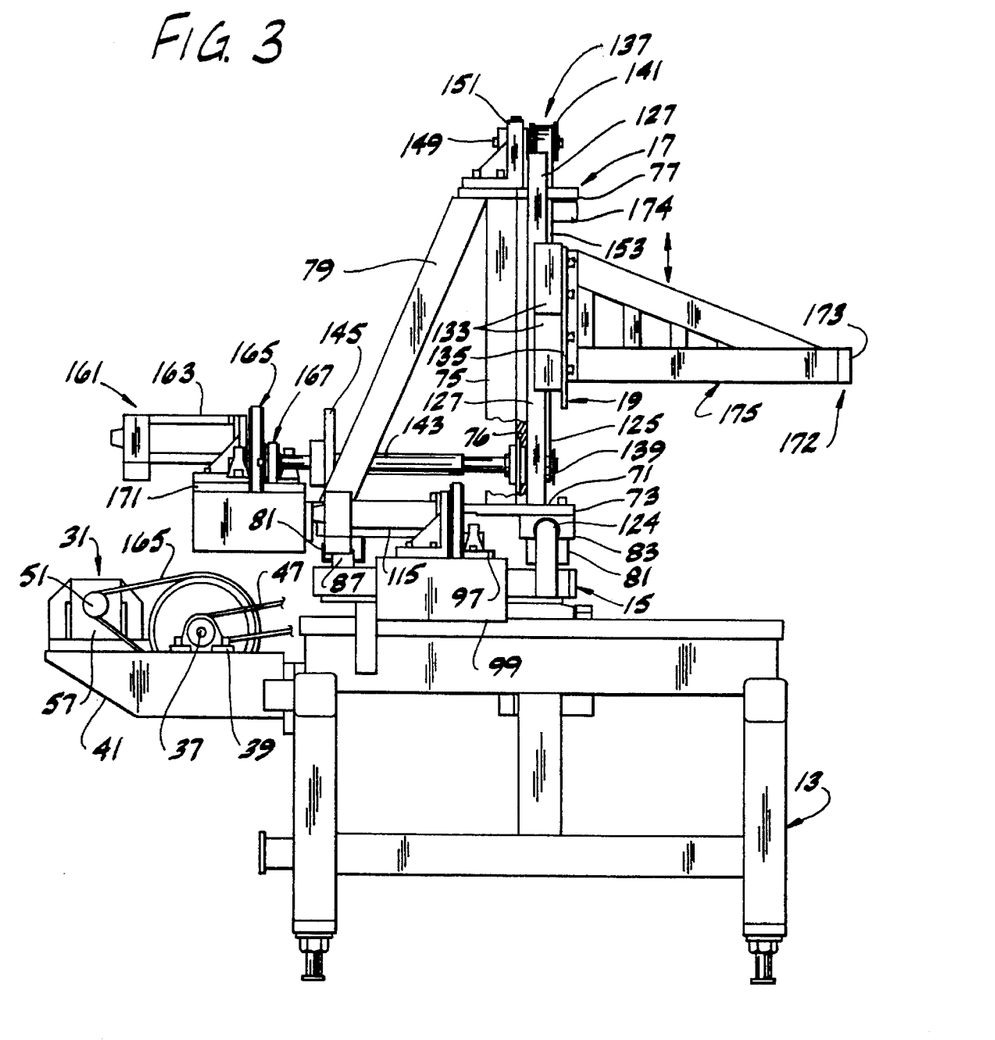
FIG. 3 is a view in side elevation of the stacker with parts broken away to show details.
Figure 4:
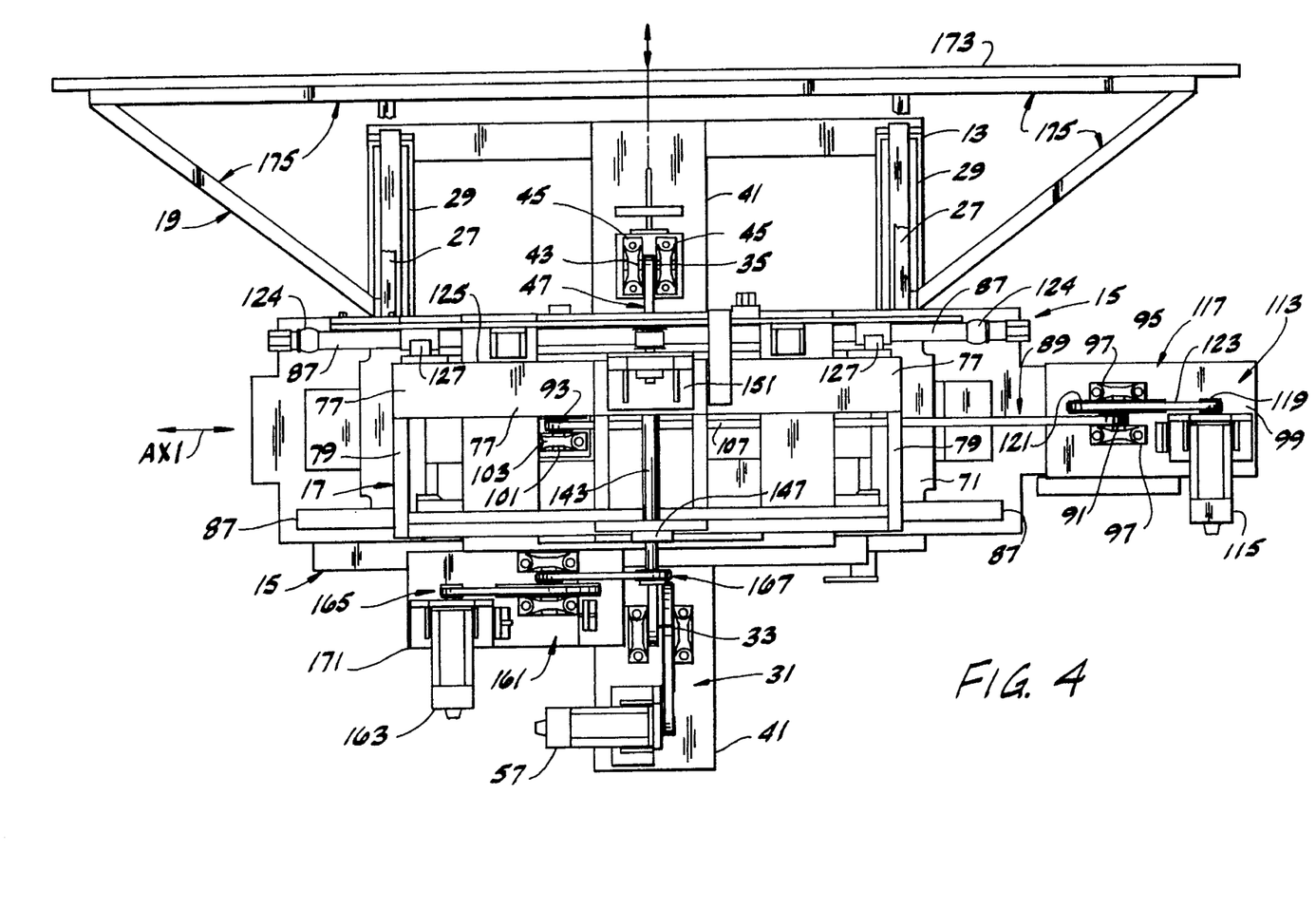
FIG. 4 is a plan view of the stacker with parts broken away to show details.

Referring now to the drawings, and first to FIG. 1, there is generally indicated at 1 apparatus (referred to in the glass container industry as a "stacker") for transferring articles A such as glass containers (e.g., glass bottles) from a first conveyor 3, sometimes referred to as a cross-conveyor, on to a second conveyor (lehr conveyor) 5 for conveyance to a lehr or oven 7, for example. As shown, the articles on the cross-conveyor are travelling from left to right generally horizontally in line one after another on a first axis AX1. Alternatively, the cross-conveyor could move the articles from right to left depending on the factory layout. In the case of glass bottles, the bottles on the cross-conveyor are usually fresh from the mold and still hot and thus readily deformable. The lehr conveyor 5 extends in a second direction on a second horizontal axis AX2 generally at right angles to the first axis AX1 from one side of the cross-conveyor 3, a so-called deadplate 11 being interposed between the cross-conveyor and the inlet end of the lehr conveyor. As in the prior apparatus disclosed in U.S. Pat. Nos. 5,044,488 and 5,092,449, the improved apparatus of this invention is operable in cycles to transfer on each cycle a group of articles (e.g., 20 articles) from the cross-conveyor to the lehr conveyor with the articles in the group extending in a row transversely of the lehr conveyor. The improved apparatus is operable to effect this transfer with little or no contact between the articles, which is very important where hot glass containers are involved to minimize the number of damaged and unusable containers which enter the lehr. It will be understood that while the improved apparatus of this invention is described herein as a stacker having special application to the glass container industry, it may have other applications in other industries for transferring various types of articles from one conveyor to another in the manner described.

Figure 5:
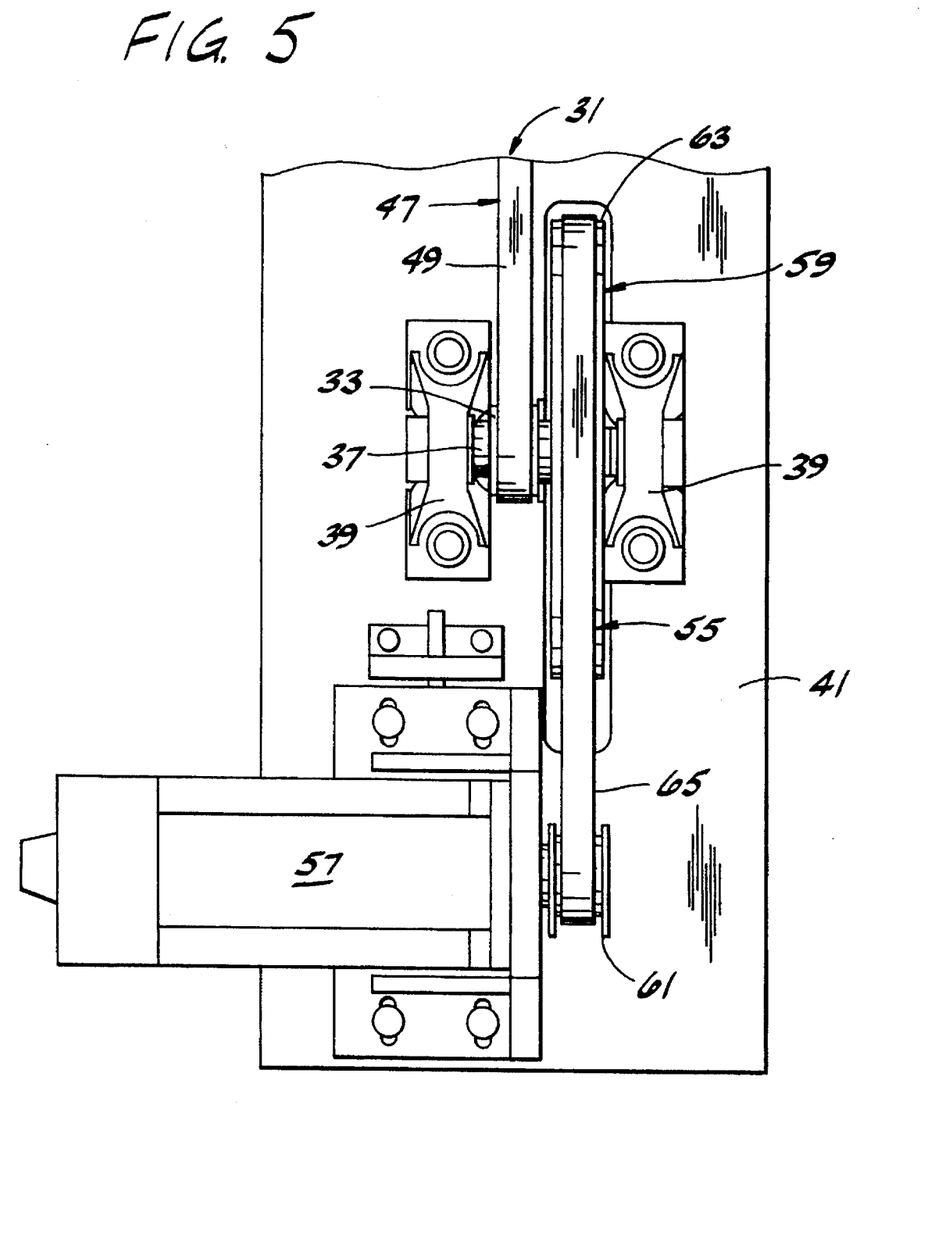
FIG. 5 is an enlarged fragment of FIG. 4 with parts omitted.
Figure 6:
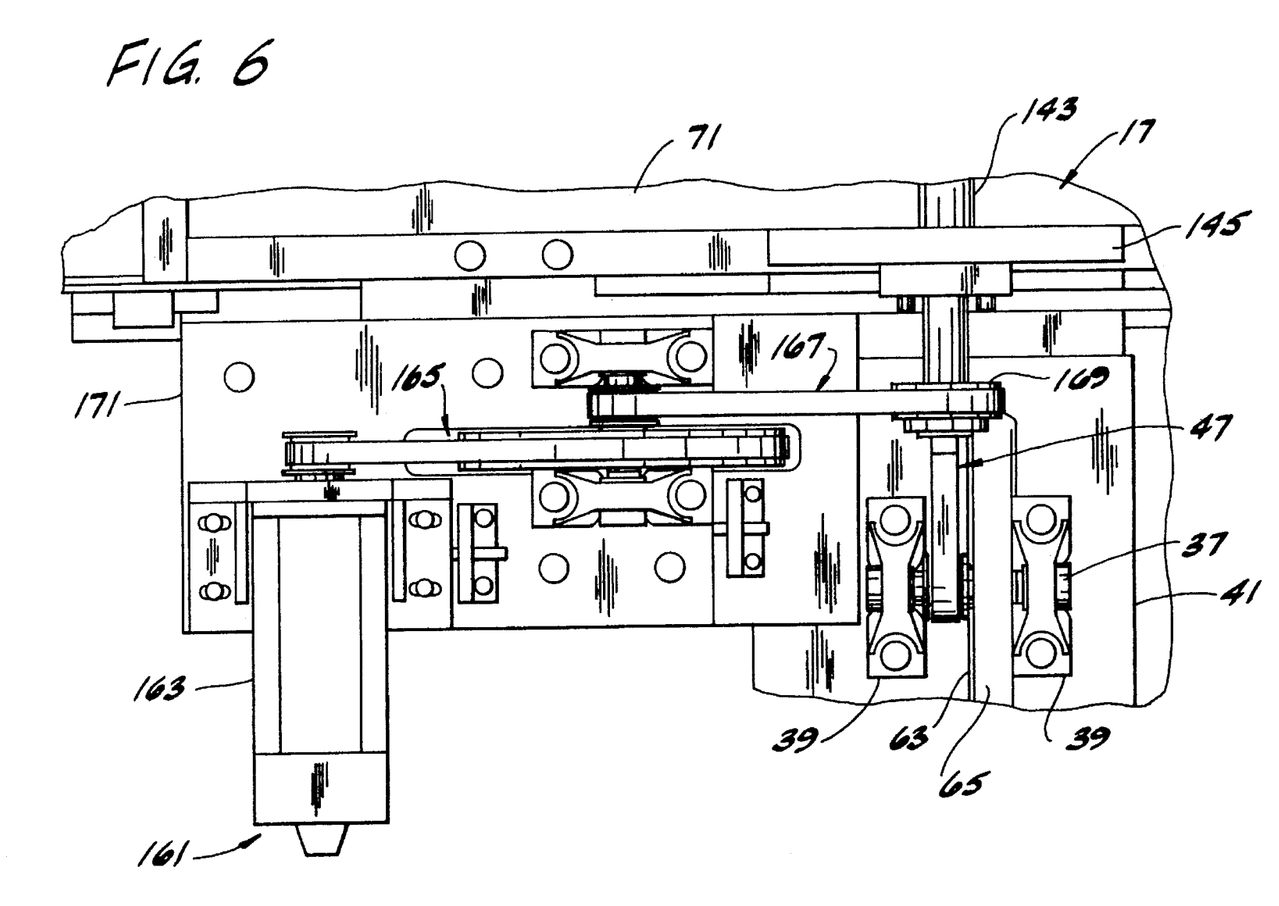
FIG. 6 is an enlarged fragment of FIG. 4.
Figure 8A:
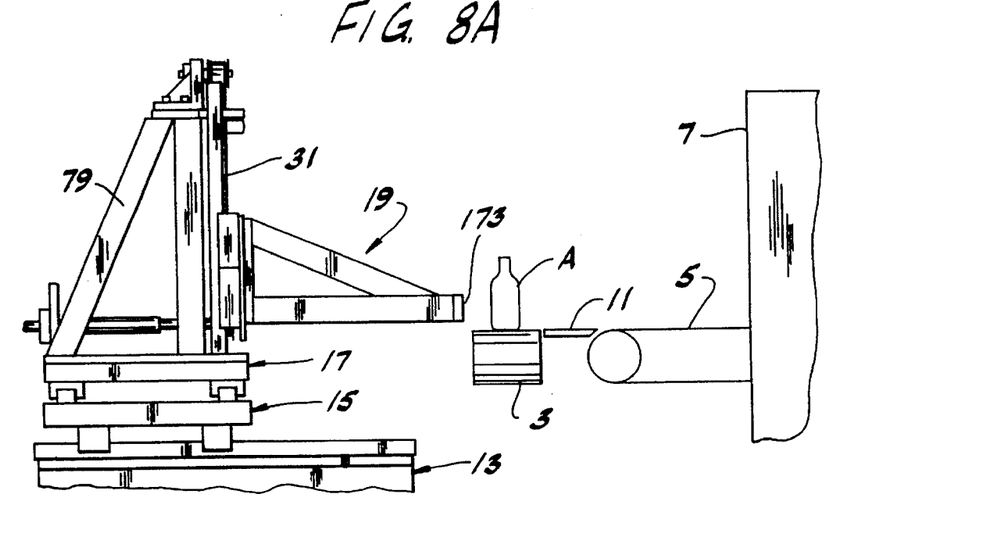
FIGS. 8A–8C are schematic views illustrating the position of the pusher bar relative to bottles on the cross-conveyor at various times during a typical cycle of operation.
Figure 9:
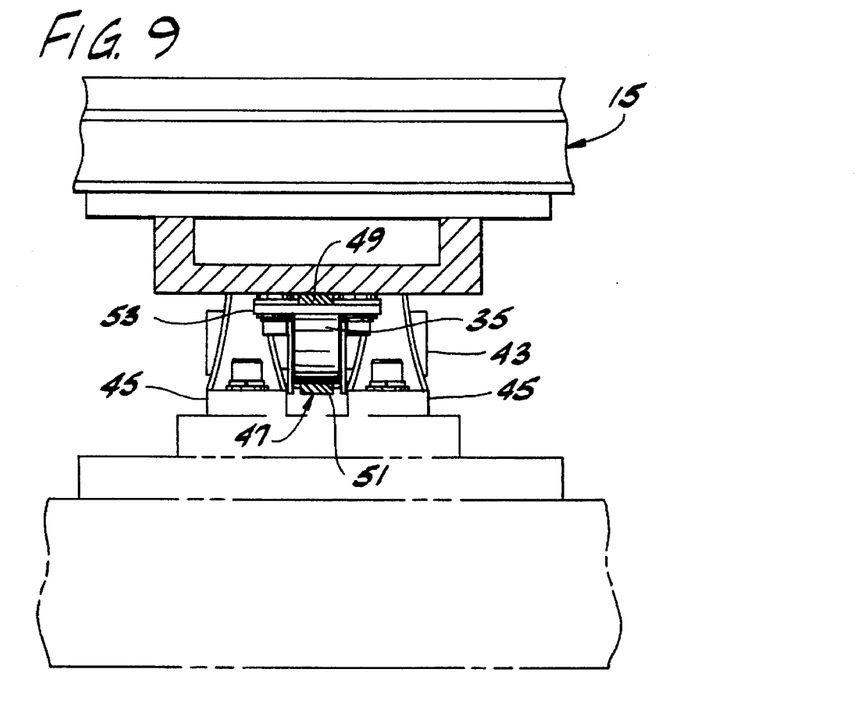
FIGS. 9 and 10 are views in section showing details.

Referring now primarily to FIGS. 2, 2A, 3 and 4, the stacker apparatus of this invention is shown to comprise a support or base 13 in the form of a table or other suitable framework positioned at the side of the cross-conveyor 3 opposite the lehr conveyor 5, and first, second and third carriages generally designated 15, 17, and 19, respectively, mounted on the support 13. The first carriage 15 comprises a framework 21 including a pair of side members each designated 21a. The framework 21 supports a horizontal top plate 23. Slide members 25 are affixed to the underside of the carriage 15 and are slidable on a plurality of spaced apart horizontal guide rails 27 rigidly mounted on the top of the table 13 and extending generally parallel to axis AX2. Each rail 27 is supported along its length by suitable supports indicated at 29. Together, the slide members 25 and guide rails 27 function as means for mounting the first carriage 15 for linear reciprocation relative to the table 13 on or generally parallel to axis AX2 in a horizontal plane above the top of the table between a retracted position (FIG. 8A) away from the cross-conveyor 3 and an advanced position toward the cross-conveyor. This reciprocation is effected by means of a first endless belt mechanism indicated generally at 31 in FIGS. 3, 4 and 5 comprising first and second pulleys 33 and 35 mounted on the support or base 13 for rotation on parallel horizontal axes spaced with respect to the direction of movement of the carriage 15 (i.e. in the direction of axis AX2). Pulley 33 is mounted on a shaft 37 (FIG. 5) journalled for rotation on a horizontal axis in a set of bearings 39 mounted on a top member 41 of the table 13, and pulley 35 is mounted on a shaft 43 journalled for rotation on a horizontal axis in a set of bearings 45 mounted on member 41. An endless belt 47, herein referred to as the first endless belt, is trained around the pulleys 33 and 35, having an upper (first) horizontal reach 49 and a lower (second) horizontal reach 51 each extending parallel to the axis AX2 (see FIG. 9). Means indicated at 53 in FIG. 9 interconnects the first reach 49 of the belt 47 and the first carriage 15 for moving the first carriage 15 from its retracted position to its advanced position upon movement of the belt in one direction and for moving the first carriage back to its retracted position upon movement of the belt in the opposite direction.

At 55 is indicated means for driving the said first endless belt 47 in opposite directions comprising a first reversible electric servo motor 57 and an endless belt drive mechanism 59 driven by the motor connected to the first pulley 33 for driving the latter. The motor 57 is mounted on an extension of the table top member 41. As shown in detail in FIG. 5 the drive mechanism 59 comprises pulleys 61 and 63 on the motor shaft and pulley shaft 37, respectively, and an endless belt 65 trained around the pulleys 61 and 63. The motor 57 is under the control of a programmable controller C (see FIG. 1), rotation of the motor being precisely controlled for effecting precise movement of the carriage 15 along or parallel to axis AX2 in forward and reverse directions.

Figure 10:
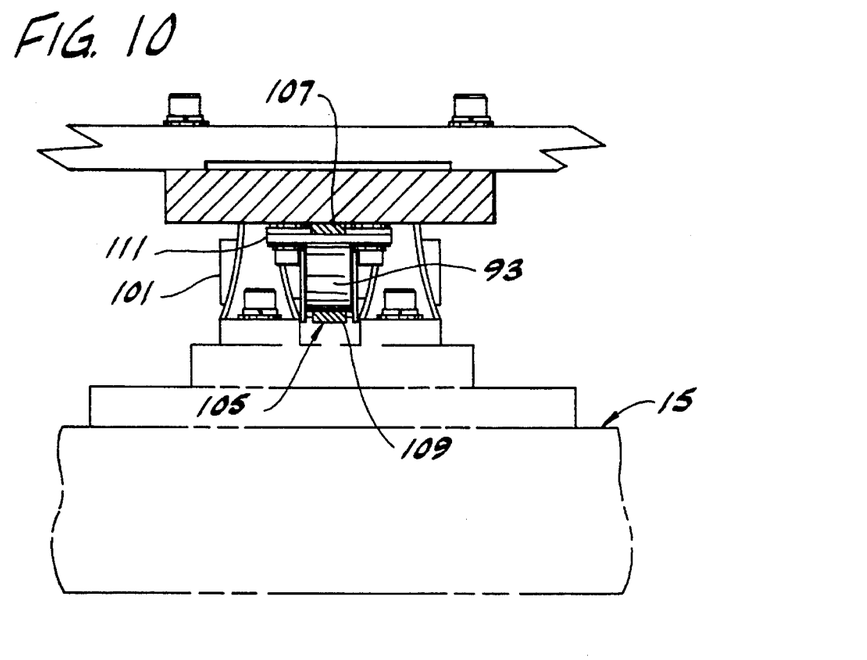

The second carriage 17 comprises a frame indicated generally at 69 comprising a horizontal bottom or base plate 71 having a forward or front edge 73, vertical end members 75 extending up from the bottom plate 71 adjacent its ends and adjacent its forward edge 73, a vertical front plate 76 on the front of the end members, a horizontal top member 77 extending between the upper ends of the vertical end members 75 and inclined braces 79. Slide members 81 affixed to blocks 83 on the underside of the bottom plate 71 of the second carriage 17 are slidable on a pair of spaced apart horizontal guide rails each designated 87 on the first carriage 15. These rails extend lengthwise of the carriage 15 generally parallel to axis AX1. Together these slide members 81 and guide rails 87 function as means for mounting the second carriage 17 for reciprocation with the first carriage 15 on or generally parallel to the second axis AX2 and for reciprocation relative to the first carriage 15 on or generally parallel to the first axis AX1. This reciprocation is effected by means of a second endless belt mechanism indicated generally at 89 comprising first and second pulleys 91 and 93 mounted on the carriage 15 for rotation on parallel horizontal axes spaced with respect to the direction of movement of the carriage 17 (i.e. in the direction of axis AX1). Pulley 91 is mounted on a shaft 95 (FIGS. 2A and 4) journalled for rotation on a horizontal axis in a set of bearings 97 mounted on a bracket 99 at one end of carriage 15, and pulley 93 is mounted on a shaft 101 journalled for rotation on a horizontal axis in a set of bearings 103 mounted on carriage 15. An endless belt 105, herein referred to as the second endless belt, is trained around the pulleys 91 and 93, having an upper (first) horizontal reach 107 and a lower (second) horizontal reach 109 each extending parallel to the axis AX1 (see FIG. 2 and 2A). Means indicated at 111 in FIGS. 2 and 10 interconnects the first reach 107 of the belt 105 and the second carriage 17 for moving the second carriage from its retracted position to its advanced position upon movement of the belt 105 in one direction and for moving the second carriage 17 back to its retracted position upon movement of the belt 105 in the opposite direction.

Figure 11:
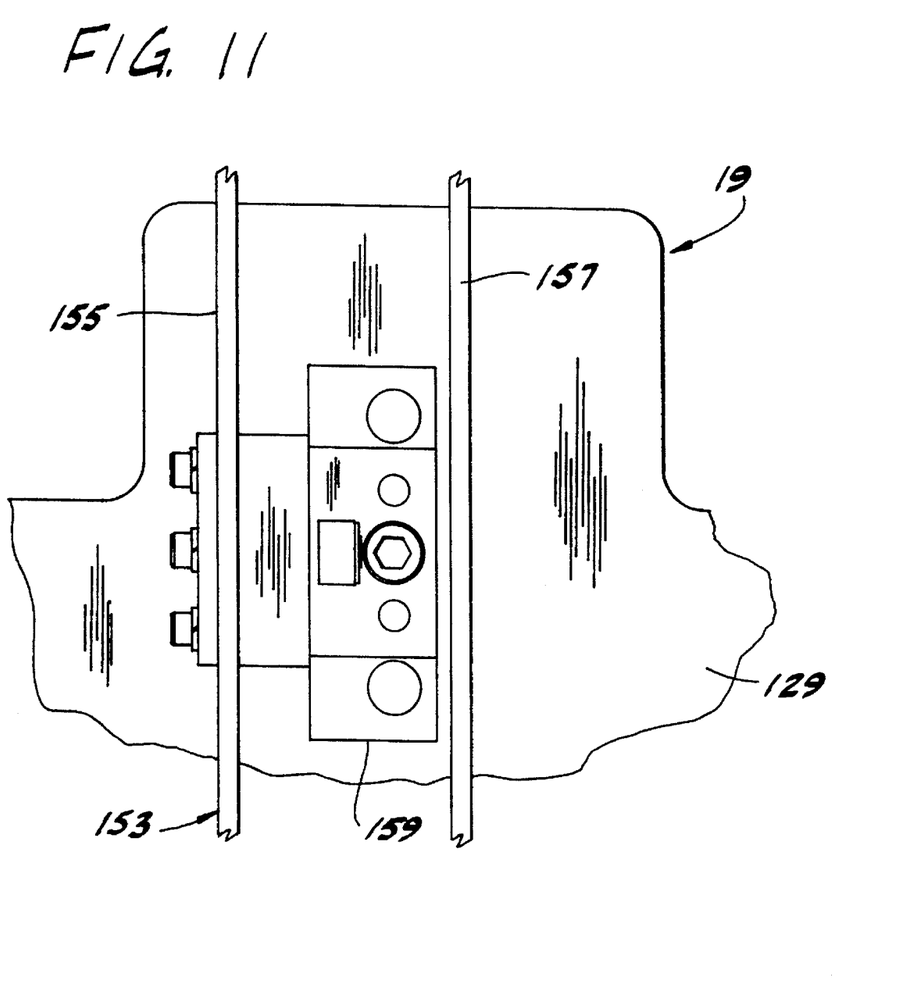
FIG. 11 is an enlarged fragment of FIG. 2A showing a detail.

At 113 is indicated means for driving the said second endless belt 105 in opposite directions comprising a second reversible electric servo motor 115 and an endless belt drive mechanism 117 (FIG. 4) driven by the motor connected to the pulley 91 for driving the latter. The motor 115 is mounted on the aforesaid bracket 99. The drive mechanism 117 comprises pulleys 119 and 121 on the motor shaft and pulley shaft 95, respectively, and an endless belt 123 trained around the pulleys 119 and 121. The motor 115 is similar to motor previously described and is under control of the aforementioned programmable controller C, rotation of the pulleys thus being precisely controlled for effecting precise movement of the carriage 17 (along or parallel to axis AX1). Stops 124 mounted on the first carriage 15 are engageable by the second carriage 17 to limit movement of the latter On its face 125 toward the conveyor 3 (its forward or front face) the vertical front plate 76 of the second carriage 17 the second carriage 17 carries guides, more particularly guide rails such as indicated at 127, extending vertically in a vertical plane parallel to the said first axis AX1. There are two such rails extending vertically parallel to one another in the said vertical plane mounted on the members 75 at the ends of the second carriage. The third carriage 19 is mounted on these rails for movement with the second carriage 17 and for linear vertical movement relative to the second carriage 17 between a lowered position (FIG. 8A) and a raised position (FIG. 8C) relative to the second carriage 17. The third carriage 19 is constituted by a plate movable up and down in a vertical plane just outside the forward face 125 of the second carriage 17, the plate having an elongate relatively narrow portion 129 with enlarged rectangular end portions 131. Each of these end portions 131 has slide members 133 on its back face 135 face slidable on the respective rail 127. Together these slide members 133 and rails 127 function as means for mounting the third carriage 19 for movement with the second carriage 17 and for linear vertical movement relative to the second carriage 17 between the stated lowered and raised positions relative to the second carriage. This reciprocation of the third carriage 19 is effected by means of a third endless belt mechanism indicated generally at 137 comprising fifth and sixth pulleys 139 and 141 mounted on the second carriage 17 for rotation on parallel vertically spaced horizontal axes (i.e. spaced with respect to the direction of movement of the third carriage 19 in the direction of axis AX3). Pulley 139 (the lower pulley) is mounted on a shaft 143 (FIGS. 2A, 3 and 4) journalled for rotation on a horizontal axis in bearings such as indicated at 145 and 147 mounted on plate 71 of the second carriage 17, and pulley 141 is mounted on a shaft 149 journalled for rotation on a horizontal axis in a bearing 151 mounted on top of carriage 17. An endless belt 153, herein referred to as the third endless belt, is trained around the pulleys 139 and 141, having vertical reaches 155 and 157 each extending parallel to the axis AX3 (see FIG. 2A). Means indicated at 159 in FIGS. 2A and 11 interconnects one of the reaches of the belt and the third carriage 19 for moving the third carriage 19 from its lowered position (FIG. 8A) to its raised position (FIG. 8C) upon movement of the belt in one direction and for moving the third carriage back to its lowered position upon movement of the belt in the opposite direction.

At 161 is indicated means for driving the said third endless belt 153 in opposite directions comprising a third reversible electric servo motor 163 and two endless belt drive mechanisms 165 and 167 driven by the motor connected to a pulley 169 on the shaft 143 for driving the latter. The motor 161 is mounted on a platform 171 carried by the second carriage. The motor 163 is similar to the motors previously described and is under the control of the aforementioned programmable controller, rotation of the pulleys thus being precisely controlled for effecting precise vertical movement of the carriage (along or parallel to axis AX3). Stops 170 mounted on the back side of the carriage (plate)

19 are engageable with plate 71 to limit downward movement of the carriage 19 and a stop 174 on the top member 77 of the second carriage 17 is engageable by the third carriage 19 to limit its upward movement.

Indicated generally at 172 (FIG. 3) is pusher means carried by the third carriage 19 for pushing a group of articles off the cross-conveyor 3 on to the lehr conveyor 5. More specifically, pusher means 172 comprises a pusher constituted by a horizontal pusher bar 173 carried by a frame 175 supported by the third carriage. The pusher bar 173 extends generally parallel to the cross-conveyor 3 (i.e., generally parallel to axis AX1) and may have means thereon forming a series of pockets spaced at intervals along the bar as described in my aforesaid stacker patents, each pocket being adapted to receive one article, and with the spacing between the pockets being selected according to the desired spacing between the articles when they are transferred on to the lehr conveyor as in my aforesaid stacker patents, each pocket may be defined (at least in part) by opposing diverging side walls which form a relatively wide mouth to facilitate entry of a respective article into the pocket. The diverging walls also function as means for guiding the article to a precise position in the pocket (a fully seated position). The V-shape of the pockets also serves to accommodate variances in spacing between the articles on the cross-conveyor. The precise size, shape and spacing of the pockets will depend on the size, shape and spacing of the articles being transferred. The pusher bar 173 may be vertically adjustable and replaceable by different pusher bars configured to handle different articles, or article spacing, etc. as in my aforesaid stacker patents. The trailing end portion of the pusher bar (the left end portion as viewed in FIG. 1) may extend endwise beyond the frame 175 as in my aforesaid stacker patents to permit incoming articles A on the cross-conveyor 3 to pass behind the pusher bar 173 without interference from the pusher bar framework 175 when the pusher bar is transferring a leading group of articles on to the lehr conveyor 5, as will become apparent.

As the third carriage 19 reciprocates vertically, the pusher bar 173 is movable with the third carriage 17 between a lowered position (FIG. 8A) wherein the pusher bar is at such an elevation relative to the cross-conveyor 3 as to be engageable with the leading group of articles on the cross-conveyor on movement of the third carriage with the second and first carriage 15 to the advanced position of carriage, and a raised position (FIG. 8C) at an elevation above the top of the articles on the cross-conveyor.

As noted, operation of the servo motors 57, 115 and 163 for driving the carriages 15, 17 and 19, respectively, is under the control of the controller C, which is programmable for operating the motors to drive the carriages in such a manner as to effect the transfer of a group of articles from the cross-conveyor on to the lehr conveyor. Generally, the controller operates motors 57 and 115 for driving the first carriage 15 from its retracted position to its advanced position, and for simultaneously driving the second carriage 17, with the pusher bar 173 down, from its trailing position to its leading position for pushing a leading group of articles off the cross-conveyor. As noted above, the pusher bar is mounted in such a manner as to allow for passage of incoming articles on the cross-conveyor behind the pusher bar when it completes the transfer of the group of articles on to the lehr conveyor. After the transfer has been completed, the controller acts to operate the motors 57, 115 and 163 to raise the third carriage 19 for raising the pusher bar 173 to its raised position to clear the articles advancing on the cross-conveyor 3, and then to drive the second carriage 17 back to its trailing position and the first carriage 15 back to its retracted position, and, after the pusher bar has moved back out over the articles advancing on the cross-conveyor, to lower the pusher bar, thereby positioning the pusher bar for the start of the next cycle of operation.

Figure 7:
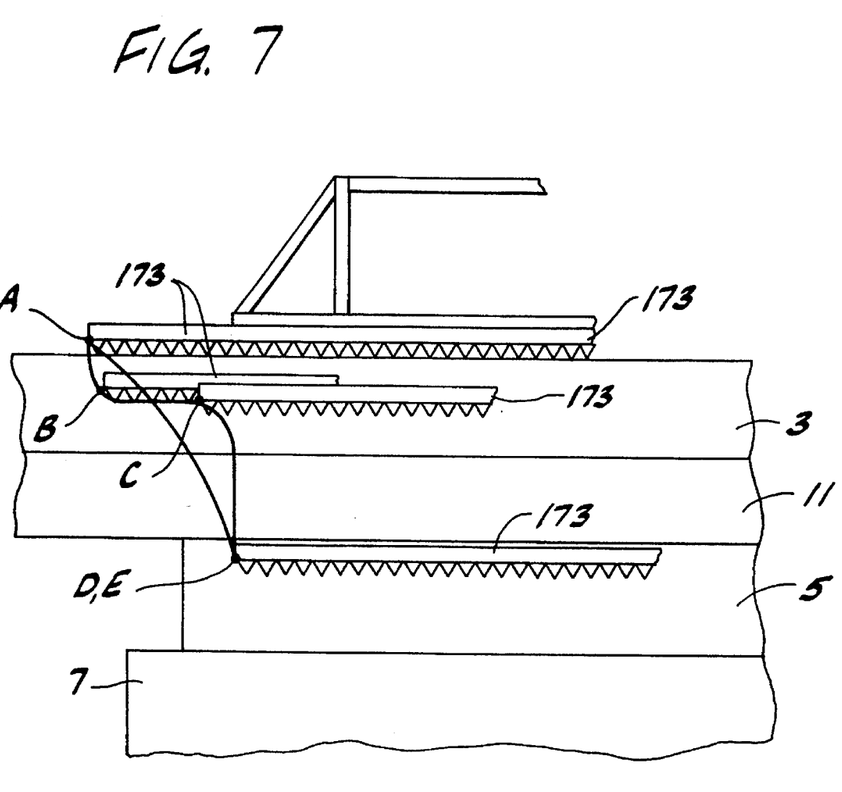
FIG. 7 is a schematic illustrating the movement of a pusher bar of the stacker in a typical cycle of operation.
Figure 8B:
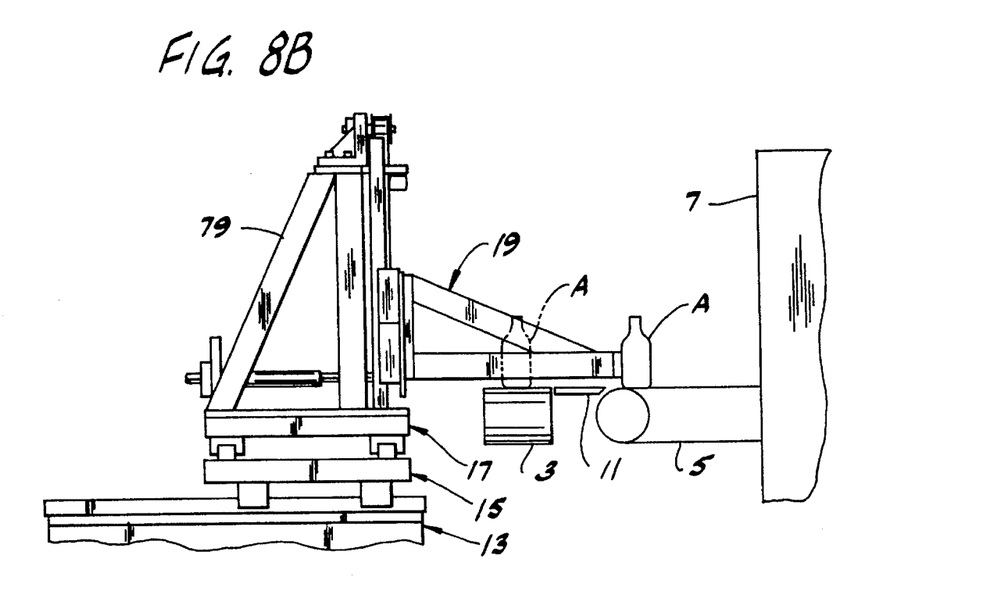
Figure 8C:
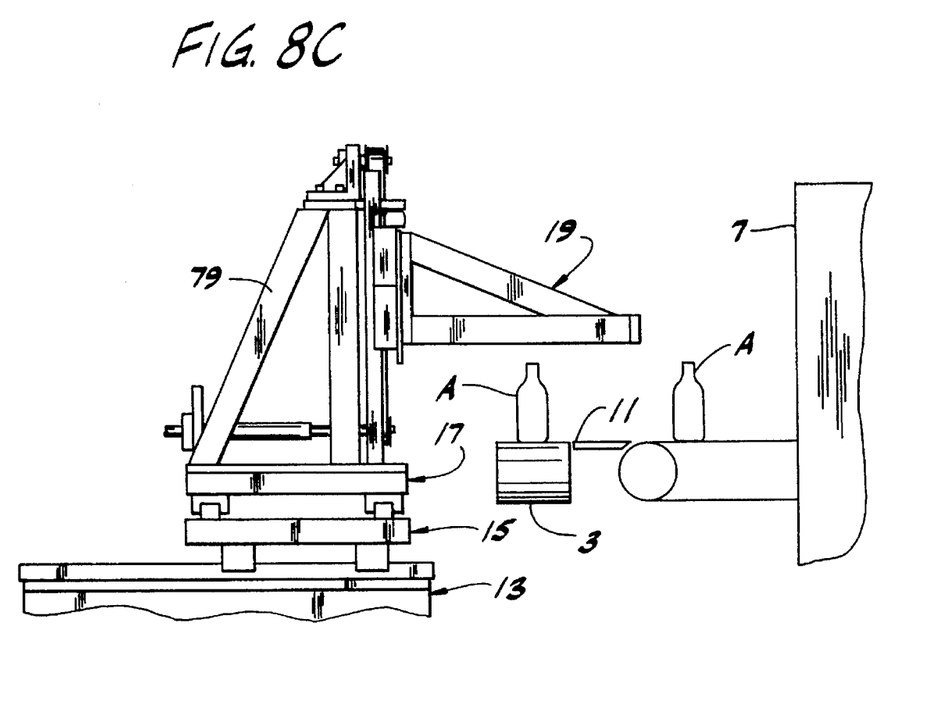

A cycle of operation of the apparatus may best be described with reference to FIGS. 7 and 8A–8C. FIG. 7 shows the path (as viewed from above the stacker) traced by a point on the pusher bar 173 during a typical cycle of machine operation, although it will be understood that the controller C may be programmed to vary this path according to the size and shape of the articles A being transferred, the speed and width of the first conveyor 3, the width of the deadplate 11, the configuration of the rows of articles transferred to the lehr conveyor 5, and other factors. At the start of a cycle, the pusher bar 173 is in position "A" (FIG. 7), the first carriage 15 is in its retracted position, the second carriage 17 is in its trailing position, and the third carriage 19 is in its lowered position. The controller 51 then operates motor 57 to drive the first carriage toward its advanced position on or generally parallel to axis AX2. Before the pusher bar reaches its advanced position, and before it engages articles on the cross-conveyor 3 (position "B"; FIG. 7), the controller simultaneously operates motor 115 to drive the second carriage on or generally parallel to axis AX1 to move the pusher bar 173 from its trailing position to its leading position in which the pockets of the pusher bar are generally aligned with the leading group of articles on the cross-conveyor 3. After this general alignment has been attained, the first carriage 15 continues to move toward its advanced position, which causes the pusher bar 173 to move into contact with the leading group of articles to be transferred, and then to push the articles, with one article in each pocket on the pusher bar, off the cross-conveyor 3, over the deadplate 11 and on to the lehr conveyor 5 with the articles in the group extending in a row transversely across the lehr conveyor for conveyance by the lehr conveyor (FIG. 8B). As the articles move toward the lehr conveyor, the friction between the bottom of each article and the deadplate will cause the article to move further into its respective pocket, with the diverging (or converging, depending on the perspective taken) side walls guiding the article to a fully seated position in which the article is precisely positioned with respect to the other articles being transferred. This ensures that the articles, as delivered to the lehr conveyor, are properly positioned for maximum efficiency and minimum contact between the articles. As the transfer is being completed, incoming articles on the cross-conveyor 3 pass behind the trailing end portion of the pusher bar 173. After the transfer has been completed, and before the leading article on the cross-conveyor has advanced to a position in which it would strike the supporting framework for the pusher bar, the controller operates the motors 57, 115 and 163 to drive the third carriage 19 to raise the pusher bar to an elevation in which it is able to clear the articles advancing on the cross-conveyor (FIG. 8C), and then to drive the second carriage 17 back to its trailing position and the first carriage 15 back to its retracted position. After the pusher bar 173 has moved back over the next group of articles advancing on the cross-conveyor, the controller operates motor 163 to lower the third carriage 19 and the pusher bar back to the FIG. 8A position. The stacker is then in position to repeat another cycle for transfer of the next group of articles (now leading) on the cross-conveyor on to the lehr conveyor.

To effect a smooth transfer, it is desirable that the speed of the pusher bar 173 along axis AX1 precisely match the speed of the articles travelling on the cross-conveyor 3 before the pusher bar makes contact with the leading group of articles. Immediately after the pusher bar has engaged the articles, it is preferred (albeit not essential) that the pusher bar accelerate relative to axis AX1 to separate the leading group of articles (now in the pockets of the pusher bar) from the trailing articles advancing on the cross-conveyor. The purpose of achieving this separation is to avoid possible collision between the pusher bar and the incoming articles advancing on the cross-conveyor as the pusher bar pushes the leading group of articles off the cross-conveyor. The separation also permits the leading articles being transferred to be pushed on to the lehr conveyor at a velocity less than what would be required if there were no separation. Pushing the articles at lower speeds is advantageous in that this provides for a smoother transfer with less risk of articles tipping over as they move on to the lehr conveyor, thereby minimizing the number of damaged articles conveyed to the lehr. It is, of course, necessary that the stroke of the second carriage be sufficiently long to allow for the slower transfer speed on or generally parallel to axis AX2.

It will be apparent from the foregoing that the transfer apparatus of the present invention can handle a wide range of article sizes, shapes and spacing, cross-conveyor speeds and widths, deadplate widths, etc., simply by suitably programming the controller to effect the appropriate movement of the carriages and/or by using a pusher bar with the appropriate pocket size, shape and spacing. Because the movement of the carriage is precisely controlled in terms of both speed and position by the servo motors and belts, the transfer of the articles is effected smoothly and efficiently. With the belt drives for the carriages 15, 17 and 19 maintenance problems (and downtime for maintenance) are reduced. Adjusting the apparatus to accommodate different situations is also accomplished in a relatively short time and with less effort, thereby minimizing the downtime of the stacker for greater line production. For purposes of illustration only, the first carriage 15 may have a maximum stroke of 21 inches, for example, the second carriage 17 a stroke of 36 inches, for example, and the controller may be programmed to vary the length of the strokes depending on the situation. For example, the stroke of the second carriage 17 may vary between alternate cycles of machine operation to stagger the articles in one row of articles transferred on to the lehr conveyor relative to the articles in the row previously transferred on to the conveyor. The offset spacing between rows of articles may be as much as one-half the spacing of the bottles in the pusher bar pockets.

Reference may be made to the aforesaid stacker U.S. Pat. No. 5,092,449 for a system which may be used with the above-described apparatus for permitting the desired stacker motion to be constructed, plotted as a motion profile curve for each axis, and tested by simulating the operation of the stacker on a video monitor. When the validity of the motions has been verified by the simulation of an operating cycle of the stacker bar, the motions are stored so that they can later be retrieved if the same job is to be repeated.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. Apparatus for transferring articles such as glass containers from a first conveyor, on which the containers are travelling generally horizontally in line one after another in a first direction on a first horizontal axis, on to a second conveyor extending in a second direction on a second horizontal axis generally at right angles to the first axis from one side of the first conveyor, said apparatus being operable in cycles to transfer on each cycle a group of articles from the first to the second conveyor with the articles in the group extending in a row transversely of the second conveyor, said apparatus comprising:

a base positionable at the other side of the first conveyor from the second conveyor, a first carriage mounted on the base for linear horizontal movement at right angles to said first axis and parallel to said second axis between a retracted position spaced away from the first conveyor and an advanced position past the first conveyor, means for effecting linear horizontal reciprocation of said first carriage back and forth between its retracted and advanced positions comprising a first endless belt mechanism mounted on the base comprising first and second pulleys mounted on the base for rotation on horizontal axes spaced with respect to the direction of movement of the first carriage, a first endless belt trained around said first and second pulleys having a reach extending parallel to said second axis, an interconnection for said reach of said first endless belt and said first carriage for moving the first carriage parallel to said second axis from its retracted position to its advanced position upon movement of said first belt in one direction and for moving the first carriage back to its retracted position upon movement of said first belt in the opposite direction, and means for driving said first endless belt in opposite directions comprising a first reversible electric motor mounted on the base and a first drive from said first motor to said first pulley, a second carriage mounted on the first carriage for reciprocation with the first carriage and for linear horizontal movement on the first carriage parallel to said first axis between a rearward retracted position and a forward advanced position relative to said first conveyor and said first carriage, means for effecting linear horizontal reciprocation of said second carriage back and forth between its retracted and advanced positions comprising a second endless belt mechanism mounted on the first carriage comprising third and fourth pulleys mounted on the first carriage for rotation on horizontal axes spaced with respect to the direction of movement of the second carriage, a second endless belt trained around said third and fourth pulleys having a reach extending parallel to said first axis, an interconnection for said reach of said second endless belt and said second carriage for moving the second carriage relative to the first carriage from the retracted position of the second carriage to its advanced position upon movement of said second belt in one direction and for moving the second carriage back to its retracted position upon movement of said second belt in the opposite direction, and means for driving said second endless belt in opposite directions comprising a second reversible electric motor mounted on the first carriage and a second drive from said second motor to said third pulley, said second carriage carrying guides extending vertically in a vertical plane parallel to said first axis at one side of the second carriage toward the first conveyor, a third carriage mounted on said guides for movement with the second carriage and for linear vertical movement relative to said second carriage between a lowered position and a raised position relative to the second carriage, means for effecting linear vertical reciprocation of said third carriage up and down between its lowered and its raised positions comprising a third endless belt mechanism mounted on the second carriage comprising fifth and sixth pulleys mounted on the second carriage for rotation on horizontal axes spaced vertically with respect to the direction of movement of the third carriage, a third endless belt trained around said fifth and sixth pulleys having a vertical reach, an interconnection for said vertical reach of said third endless belt and said third carriage for moving the third carriage up from its lowered position to its raised position upon movement of said third belt in one direction and for moving the third carriage back down to its lowered position upon movement of said third belt in the opposite direction, and means for driving said third endless belt in opposite directions comprising a third reversible electric motor mounted on the second carriage and a third drive from said third motor to said fifth pulley, a pusher carried by said third carriage for pushing a group of articles off the first conveyor on to the second conveyor, said pusher being located at such an elevation relative to the first conveyor when the third carriage is in its said lowered position as to be engageable with said group of articles on the first conveyor on movement of the third carriage with the second and third carriages from the retracted position of the first carriage to its advanced position, and at such an elevation when the third carriage is in its said raised position as to clear the tops of articles on the first conveyor, and a programmable controller for controlling said first, second and third electric motors for operation in cycles each starting with the first carriage in its retracted position, the second carriage in its rearward position and the third carriage down in lowered position and comprising operating the first motor in the direction to drive the said reach of the first belt in the direction to move the first carriage inwardly from its retracted to its advanced position and operating the second motor in the direction to drive the said reach of the second belt to move the second carriage forward to its forward position and moving the pusher forward for pushing a group of articles off the first conveyor and onto the second conveyor, then operating the third motor in the direction to drive the said reach of the third belt to move the third carriage to its raised position for clearing articles advancing on the first conveyor, operating the first motor in the direction to drive the said reach of the first belt in the opposite direction to move the second carriage back to its rearward position, operating the second motor in the direction to drive the said reach of the second belt to move the first carriage back to its retracted position to retract the pusher means, and then operating the third motor in the direction to drive the said reach of the third belt in the direction to move the third carriage back down to its lowered position.

2. Apparatus as set forth in claim 1 wherein said programmable controller is programmable to operate said second motor to drive the second endless belt to accelerate the second carriage in its forward movement immediately after the pusher has contacted said group of articles to begin transfer of the group from the first conveyor on to the second conveyor, the acceleration serving to effect a separation of the group of articles being transferred from the incoming articles advancing on the first conveyor.

3. Apparatus as set forth in claim 2 wherein said programmable controller is programmable to operate said second motor to drive the second endless belt in such manner as to vary the stroke of the second carriage between its rearward and forward positions on alternate cycles of operation of the apparatus to stagger the articles in one row of articles transferred on to the second conveyor relative to the articles in the row previously transferred on to the conveyor.

4. Apparatus as set forth in claim 1 having stops on the first carriage for limiting movement of the second carriage on the first carriage, and stops on the second carriage engageable by the third carriage for limiting movement of the third carriage on the second carriage.

5. Apparatus as set forth in claim 1 wherein said first direction may be right or left as viewed in the direction toward the second conveyor.

6. Apparatus as set forth in claim 1 where said first conveyor is moving at a specified speed and said programmable controller is programmable to operate said first motor to drive said first endless belt at said specified speed.

* * * * *